May 11, 1926.

W. H. ROBBINS 1,584,145

MACHINE FOR MAKING STEEL WOOL

Filed Oct. 14, 1924     10 Sheets-Sheet 1

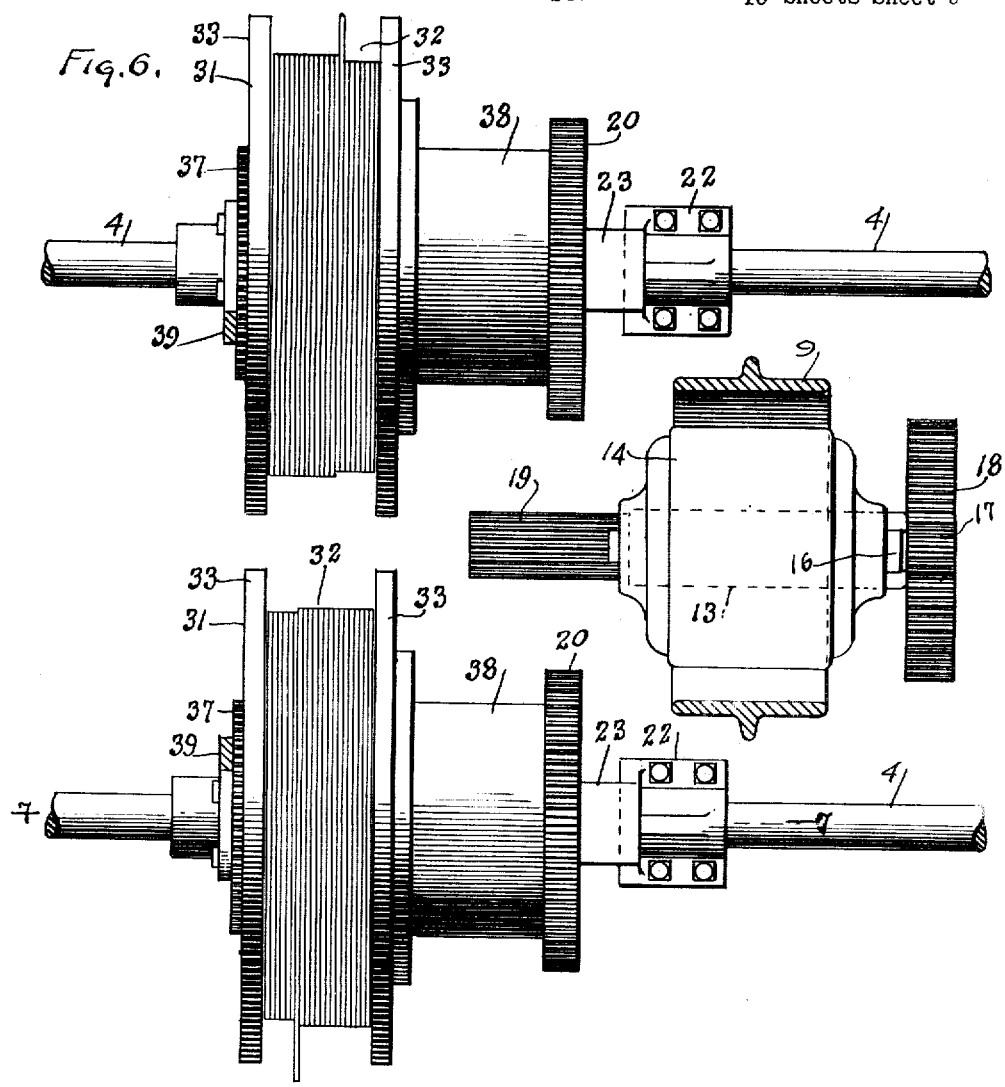

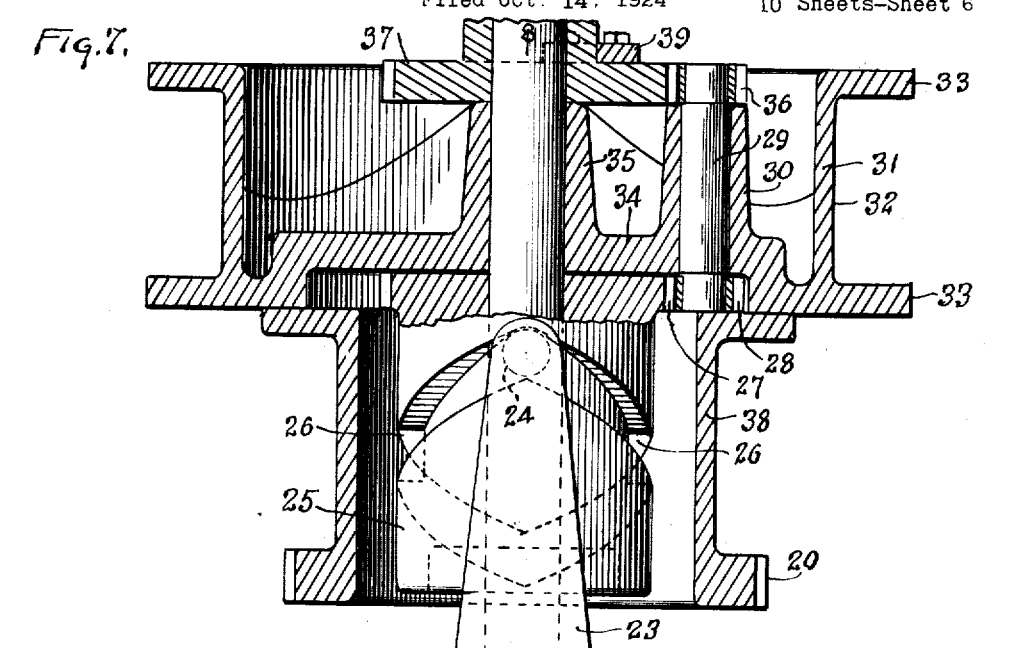
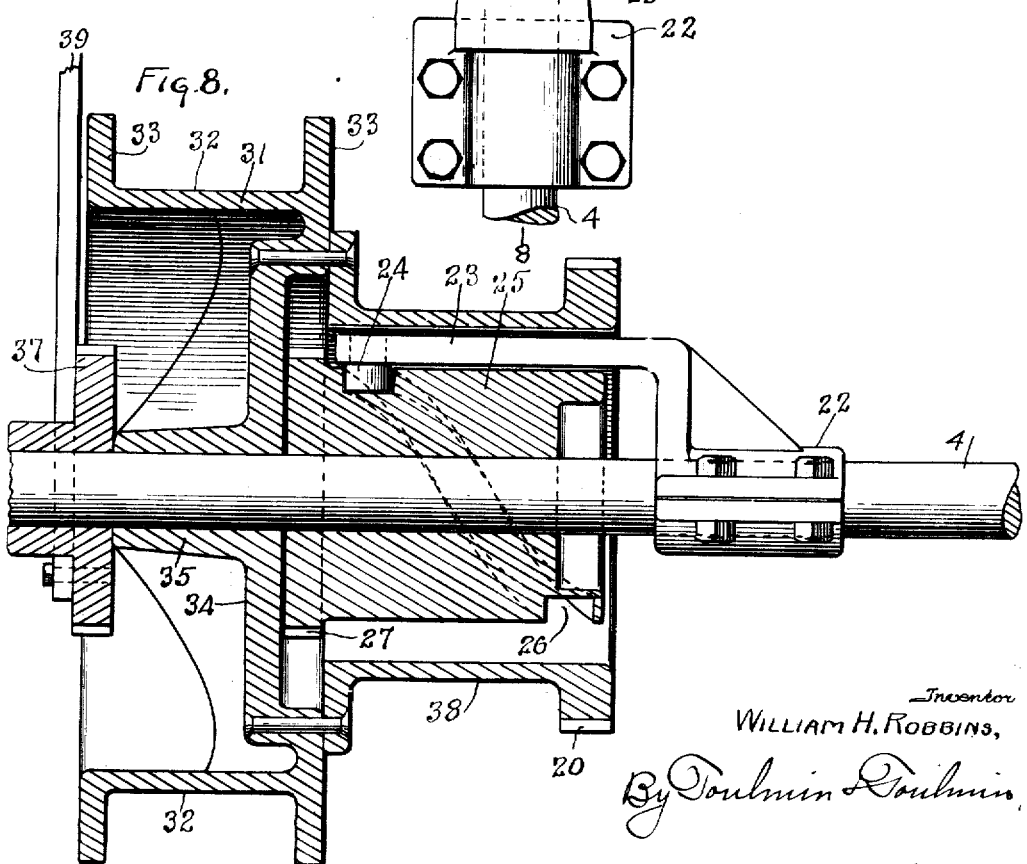

May 11, 1926. 1,584,145
W. H. ROBBINS
MACHINE FOR MAKING STEEL WOOL
Filed Oct. 14, 1924 10 Sheets-Sheet 7
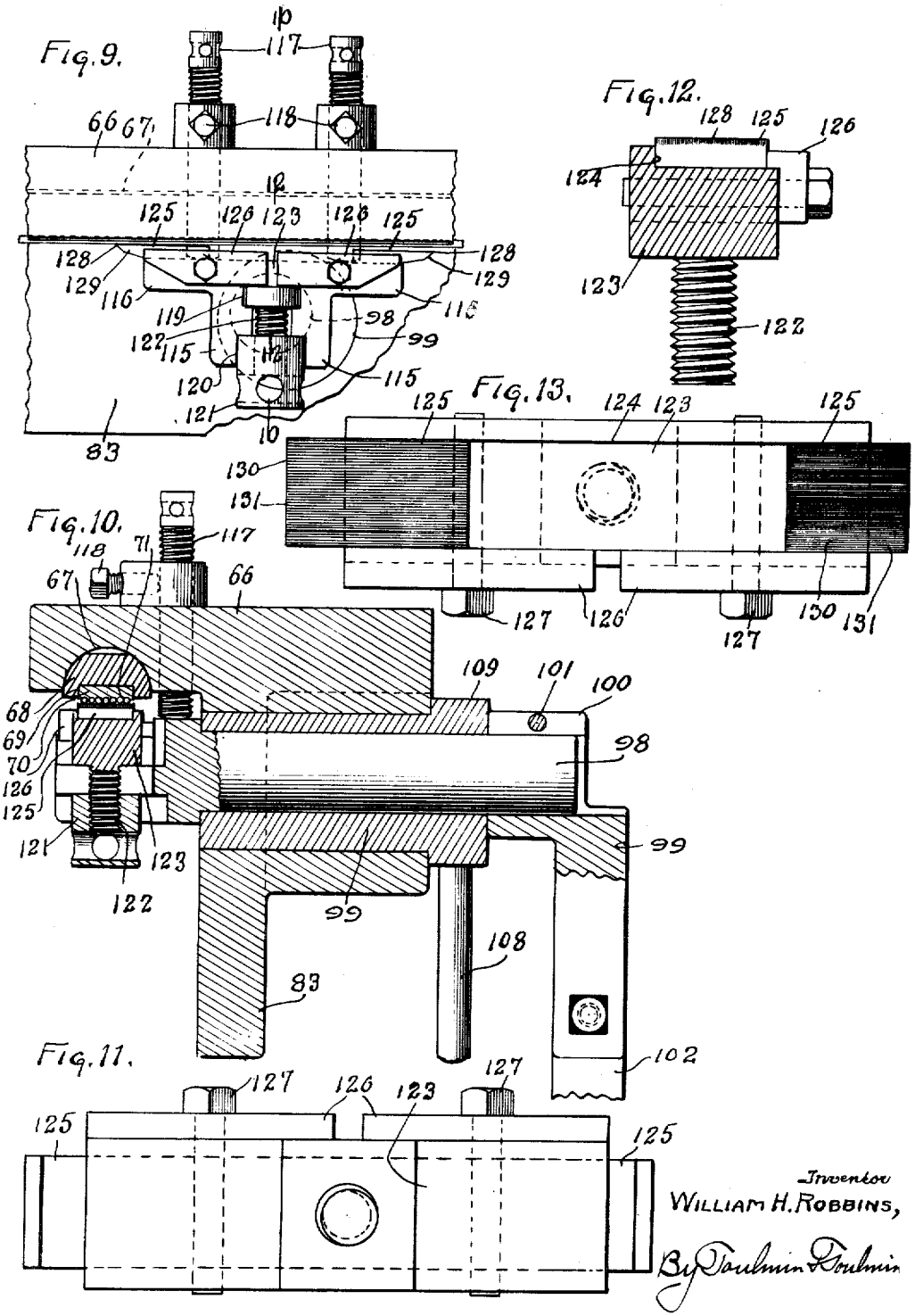

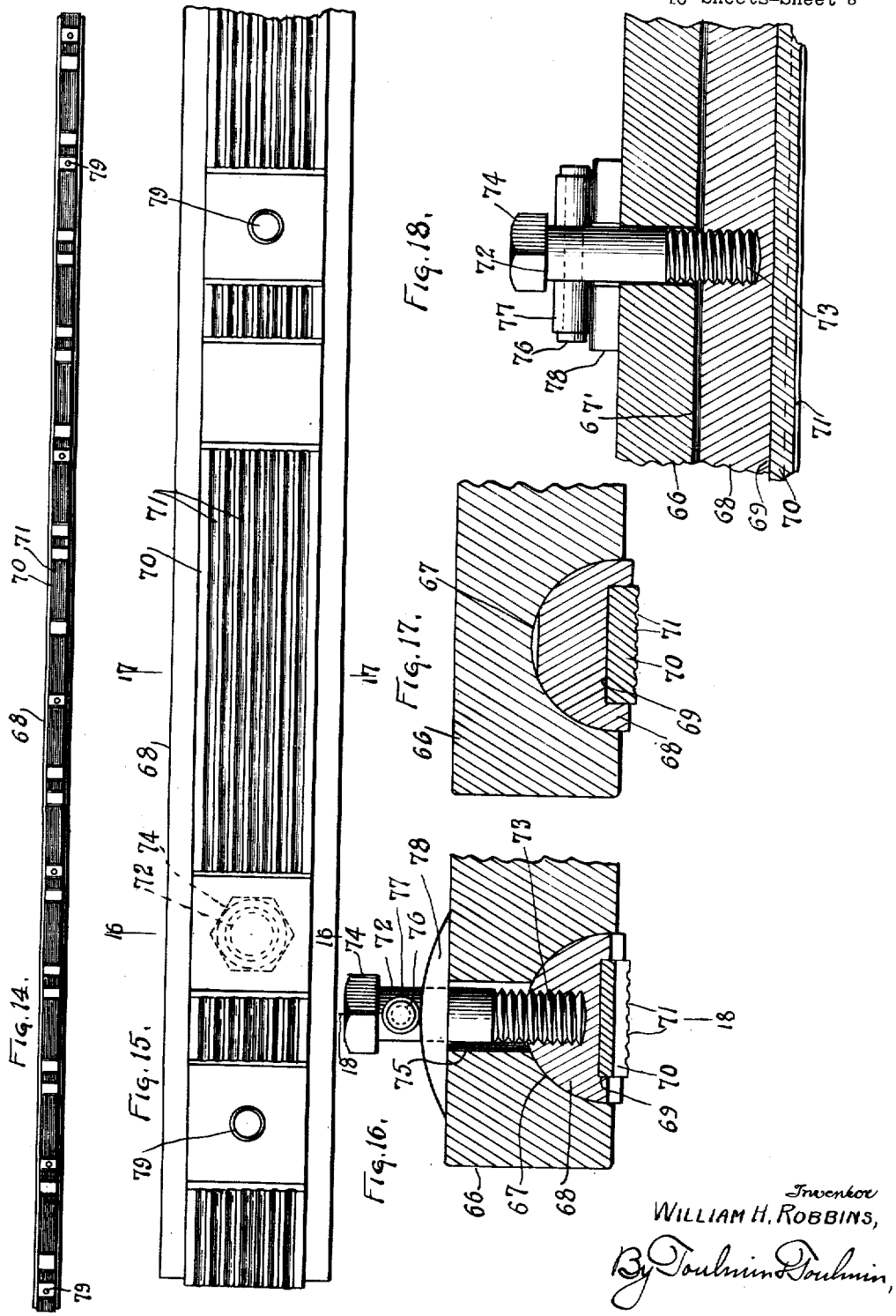

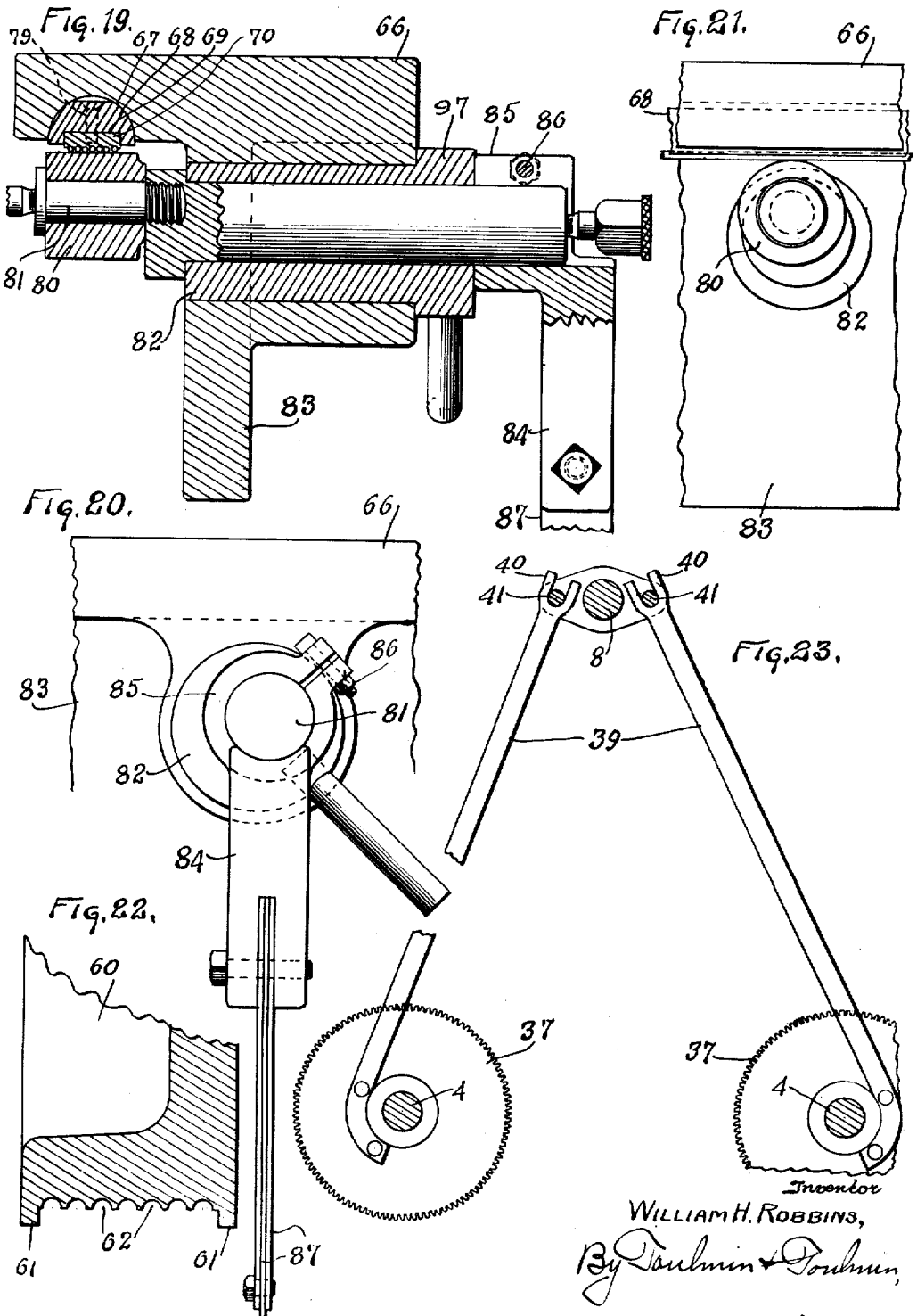

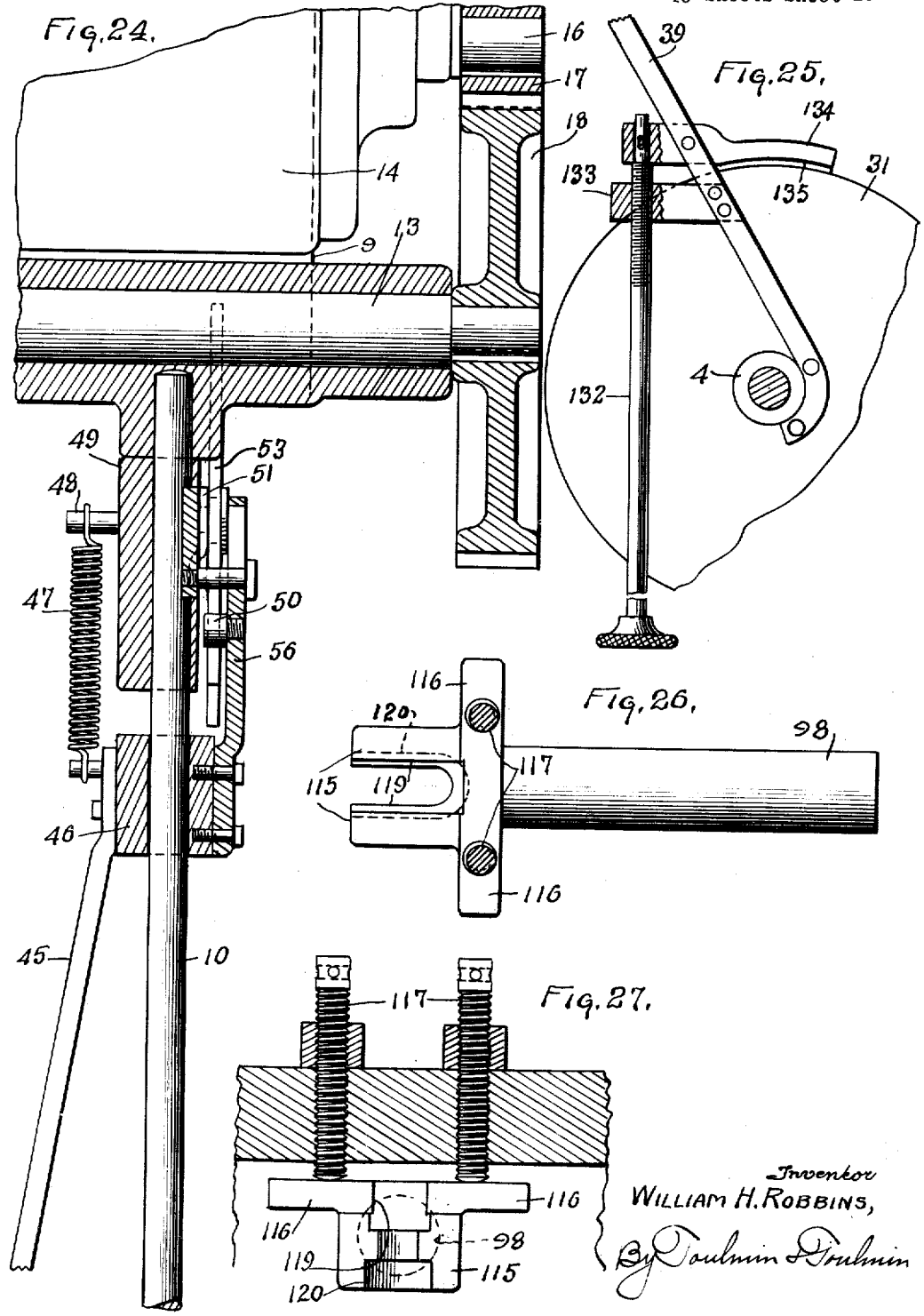

Patented May 11, 1926.

1,584,145

UNITED STATES PATENT OFFICE.

WILLIAM H. ROBBINS, OF SPRINGFIELD, OHIO, ASSIGNOR TO THE WILLIAMS COMPANY, OF LONDON, OHIO, A CORPORATION OF OHIO.

MACHINE FOR MAKING STEEL WOOL.

Application filed October 14, 1924. Serial No. 743,630.

My invention relates to a machine for the manufacture of steel wool.

It is the object of my invention to provide a machine which will simultaneously produce steel wool from a large number of wires or a large number of strands of the same wire.

It is a further object of my invention to provide a machine in which the tension on the wire will be maintained at a uniform point.

It is a further object of my invention to provide means for automatically compensating for the differences in thickness in the several strands of wire being treated so that they will be uniformly cut irrespective of their thickness.

It is an additional object of my invention to provide means of winding and unwinding the single strand of wire and of moving a plurality of loops thereof in such a way as to maintain the wire with uniform tension but with the least strain thereon so that the wire will not have all of the strain thereon at any given point in its length.

It is an object to provide driving means for moving the loops of wire at certain relatively close intervals synchronized with power driven means for winding and unwinding said wire.

It is a further object of my invention to provide means for reversing the direction of the movement of the wire and of the loops thereof without disturbing the wire.

It is an object of my invention to provide a constant speed drive and a variable speed winding apparatus to insure constant tension on the wire.

It is an object of my invention to provide means of adjustably supporting the plurality of strands of wire with relation to the cutting tools and means for applying the tools to the wire or moving the tools to a neutral position, said means being so arranged that by a single unitary control either of each pair of tools may be used or rendered inoperative.

It is a further object of my invention to provide a unitary control for the wire supports.

It is an additional object to provide means of adjusting the position of the supports and of the tool holders independently of one another as well as in synchronism.

It is an additional object of my invention to provide means of maintaining the winding and unwinding supports for the wire in alignment with the supports for the loops of wire so that there will be no torsional twisting or deflection of the wire as it is fed or rewound.

It is an additional object of my invention to provide means of automatically locking the winding and unwinding mechanism in either operative position.

Referring to the drawings:

Figure 6 is a plan view of the mechanism shown in Figure 5 with the motor cradle or swinging frame in section on the line 6—6 of Figure 3;

Figure 7 is a section on the line 7—7 of Figure 6 showing the cam mechanism and differential gearing for one of the winding or unwinding drums;

Figure 8 is a section on the line 8—8 of Figure 7 showing similar mechanism;

Figure 9 is a front elevation of a portion of the supporting frame for the cutting tools;

Figure 10 is a section on the line 10—10 of Figure 9 showing the supporting table and cutters, wire guide and mechanism for adjusting the position of the cutters with respect to the strands of wire;

Figure 11 is a bottom plan view of the cutter;

Figure 12 is a section on the line 12—12 of Figure 9 showing the construction of the tool holder and clamp;

Figure 13 is a top plan view of the cutter;

Figure 14 is a plan view of the entire guide plate for guiding the wires;

Figure 15 is a detail view of a portion thereof;

Figure 16 is a section on the line 16—16 of Figure 15;

Figure 17 is a section on the line 17—17 of Figure 15;

Figure 18 is a section on the line 18—18 of Figure 16;

Figure 19 is a section through the supporting roller, its operating mechanism, the bed plate and wire guide on the line 19—19 of Figure 1;

Figure 20 is a rear elevation of the same mechanism;

Figure 21 is a front elevation thereof;

Figure 22 is an enlarged view of the end of one of the sheaves showing the guiding grooves for the strands of wire;

Figure 23 is an end elevation of the mechanism for maintaining the gears of the planetary gear system in stationary position;

Figure 24 is a section on the line 24—24 of Figure 4 showing in detail the mechanism for operating the locking arms which maintain the driving mechanism in operating position;

Figure 25 is a detail view in elevation of the brake mechanism for preventing the too rapid unwinding of the unwinding drum;

Figure 26 is a plan view partially in section of the supporting jaws for the tool holder showing the clamping screw in place;

Figure 27 is a front elevation partially in section of the supporting jaws for the tool holder showing in detail the mechanism to rock the jaws for adjustment about the axis of the shaft.

*Winding and unwinding mechanism.*

Figure 1:
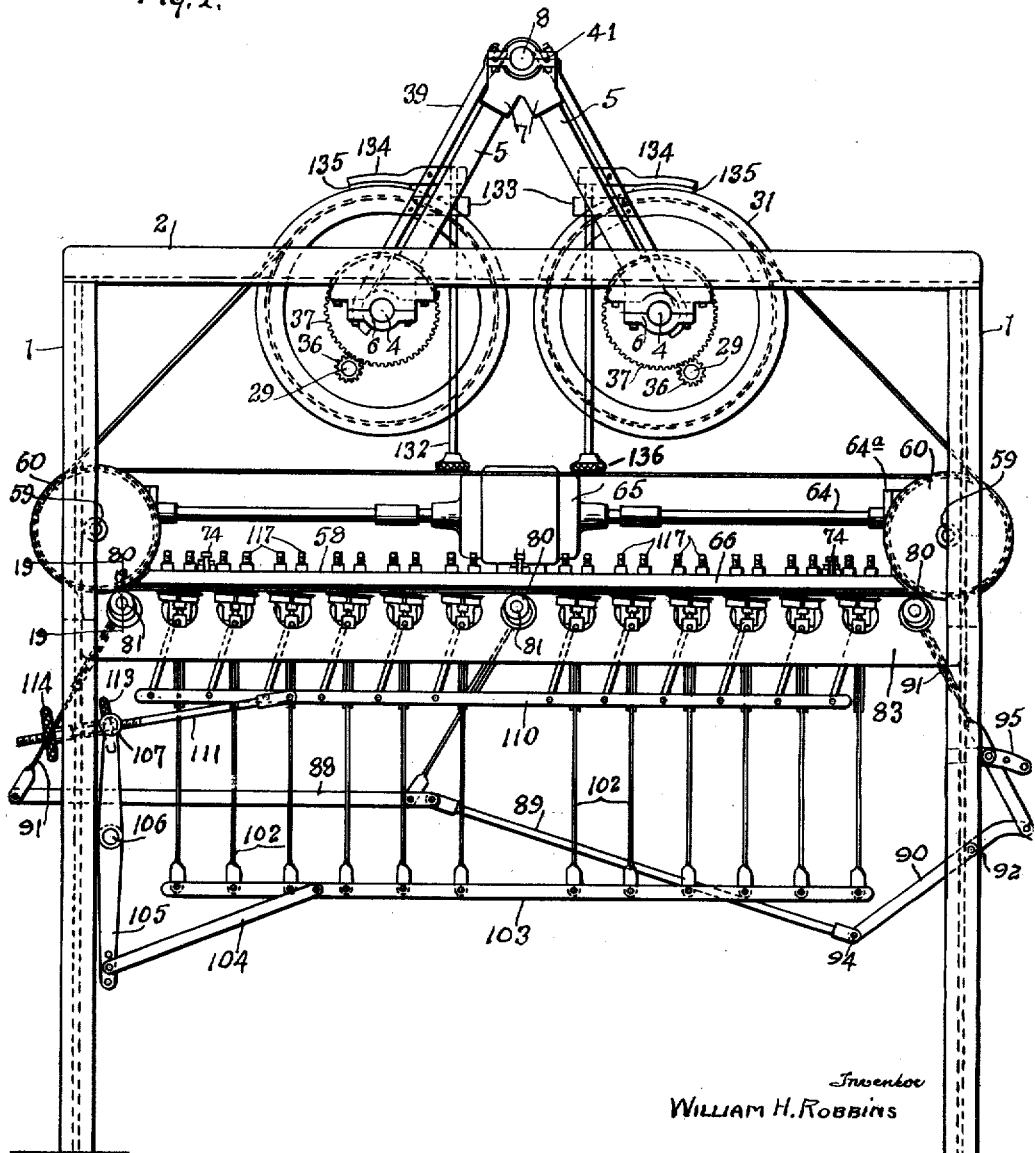
Figure 1 is a front elevation of the complete machine.
Figure 2:
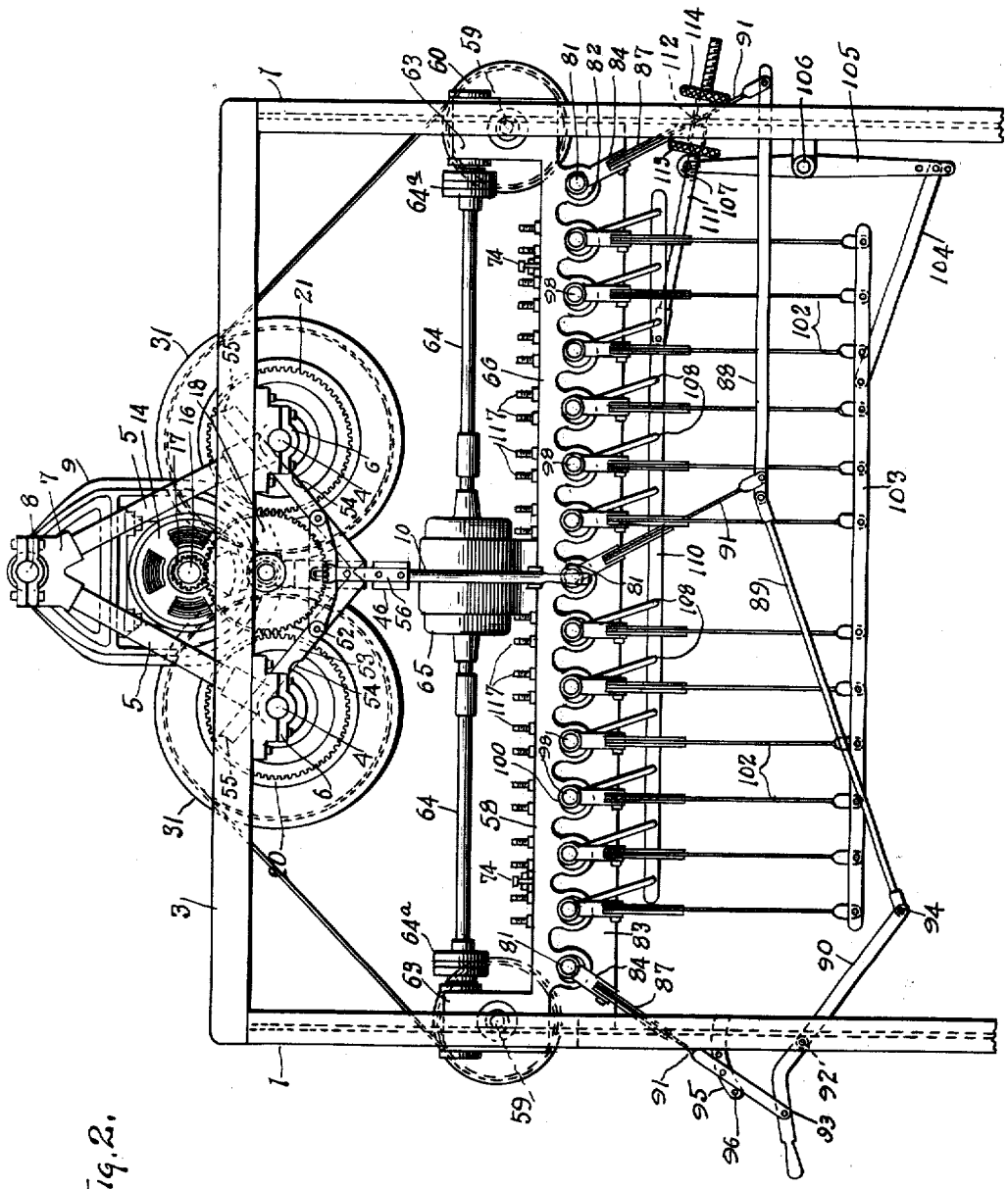
Figure 2 is a rear elevation thereof.
Figure 3:
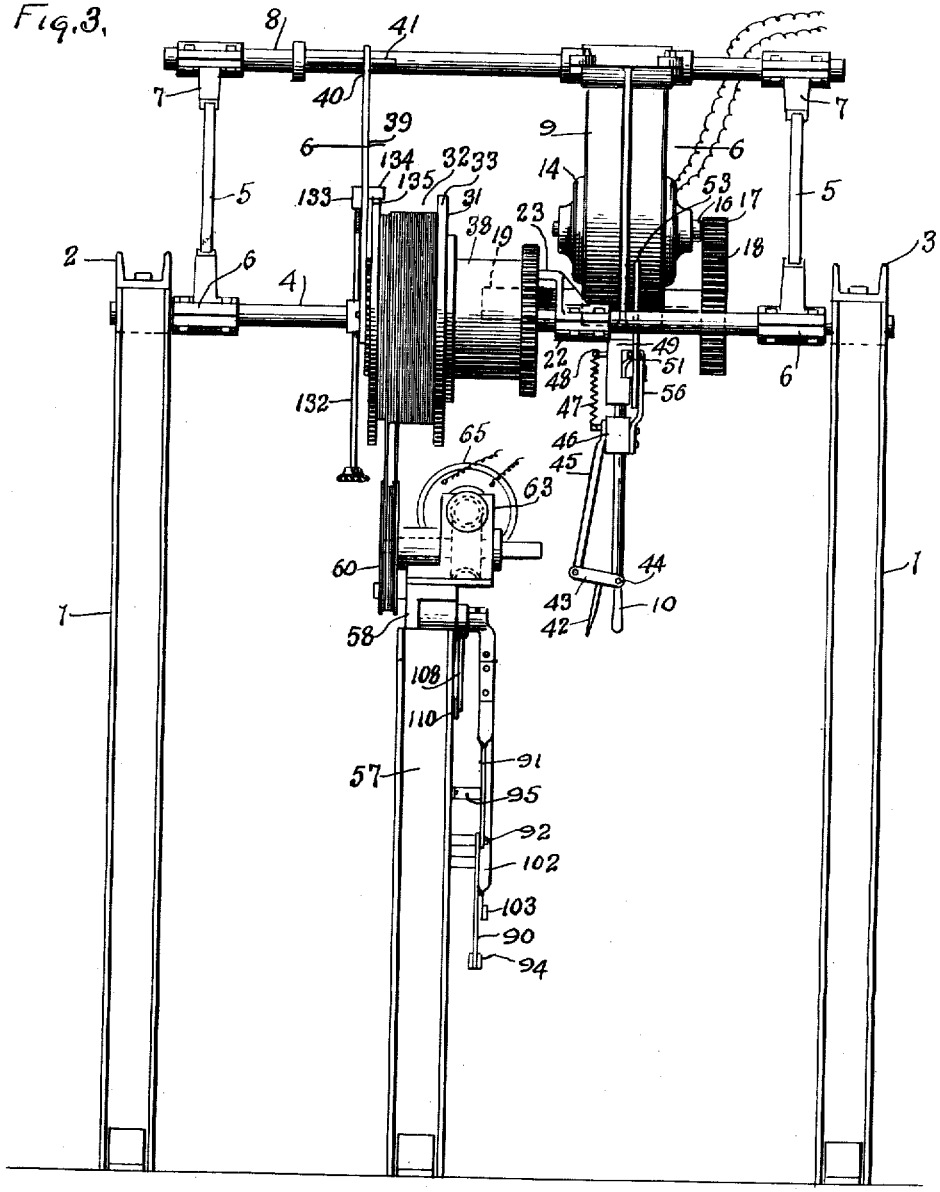
Figure 3 is an end elevation thereof.
Figure 4:
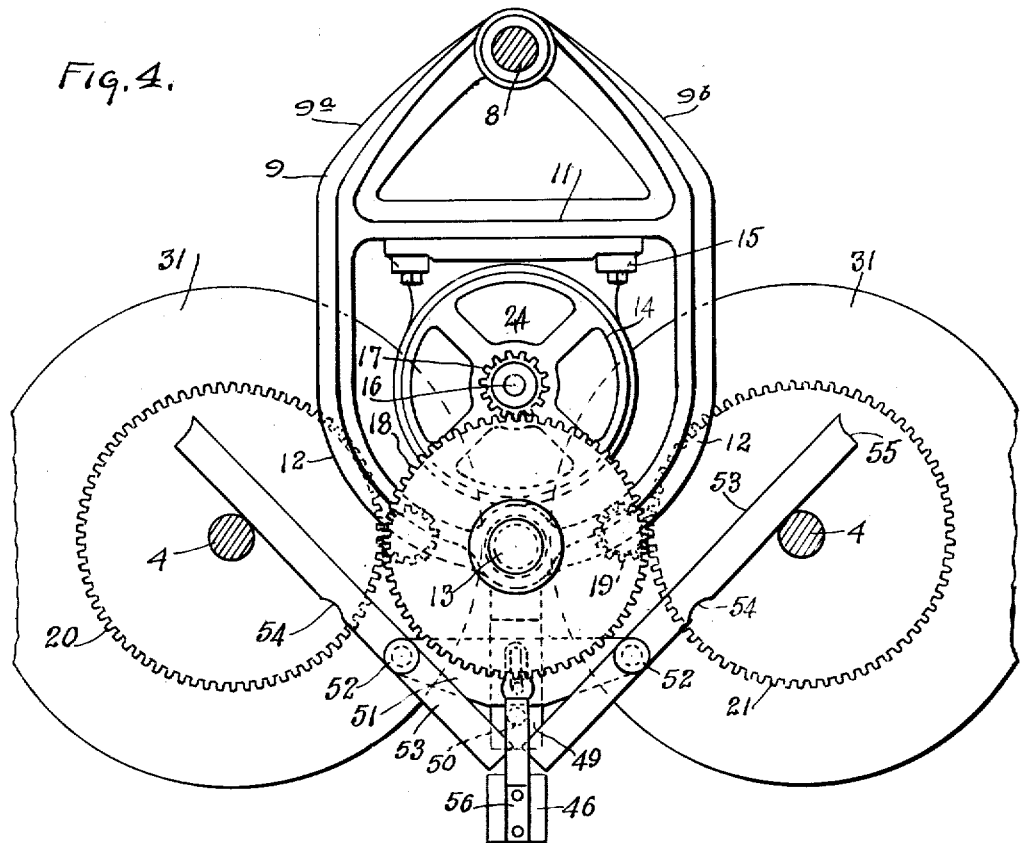
Figure 4 is a rear elevation of the mechanism for winding and unwinding the strand of wire.

Referring to the drawings in detail, 1—1 refer to vertical standards of which there are 4 designed to support the wire winding and unwinding mechanism and the power mechanism therefor. These standards are joined together in pairs by the transverse members 2 and 3.

Thus a unit is formed of two vertical standards and a transverse member, such units being spaced from one another but parallel to each other. These units are joined together by fore and aft rods 4. Upon such rods are mounted split collars 6 carrying diagonal rods 5 or other similar supporting members which are in turn joined in a V-shaped receiving member 7 which is also formed as a split collar so that it can be mounted upon the rod 8 which is carried in the spaced collars 7 having the V-shaped casting for receiving the supporting rods 5.

Upon this rod 8 is supported the motor cradle 9. The cradle swings back and forth upon this supporting shaft 8. Also upon 4 slides a supporting mechanism for the winding and unwinding drums and the mechanism which moves these drums fore and aft.

It is thus apparent that there is provided a self-contained and independently supported unit for the winding and unwinding of the strand of wire. As will be hereinafter explained this unit is reversible or may be placed in neutral through the control by a single lever designated 10.

The power drive for actuating the drums carrying the strand of wire consists of a cradle 9 which is formed of a pair of spaced arms 9ª and 9ᵇ joined together by a transverse motor supporting member 11 thus forming a triangular structure. From these spaced arms 9ª and 9ᵇ depends a U-shaped member 12 which supports at its lower end a shaft 13 in a bearing provided in the lower end of the U-shaped casting 12.

The motor 14 is bolted as at 15 to the bottom of the transverse member 11. This motor carries on its armature shaft 16 a pinion 17 which meshes with a large gear 18 carried on the shaft 13.

The other end of the shaft 13 carries a relatively long gear 19 which is adapted to mesh with either gear 20 or 21 depending upon which gear and its associated mechanism it is driving.

Referring first to Figures 7 and 8 in particular, it will be observed that there is mounted upon the stationary fore and aft rod 4 a split collar 22 which carries a forwardly projecting arm 23. On the end of this arm, which is in the form of a bracket, is a roller 24 having its axis in the vertical.

The bracket 23 is so arranged that a portion of it is spaced above, away from, but parallel to the stationary rod 4. Between the bracket 23 and the rod 4 is located a sleeve having spiral cam grooves cut therein. This sleeve is designated 25 and the grooves are designated 26. The roller is stationary save for its revolution about its own axis, but the sleeve in which the cam slots are cut rotates on the shaft 4. This sleeve is positively connected to a gear 27. The gear meshes with a pinion 28 which is mounted upon a stud shaft 29 carried in a lengthened sleeve 30 which forms a part of the supporting base of the wire drum 31. This drum is provided with a surface 32 for supporting the wire and flanges 33 for preventing the wire from leaving the drum laterally. The drum is mounted upon a disk at one side thereof designated 34 which has a lengthened sleeve 35 to form the bearing support for the drum upon the rod 4.

The shaft 29 carries at the end opposite to the end supporting the gear 28 a similar gear 36 which meshes with a non-rotative and relatively large gear 37 which is maintained in a non-rotative position by the arm 39, but said gear is free to slide on the shaft 4. This arm projects upwardly and laterally to the vicinity of the shaft 8 as will be seen in Figure 23. It terminates in a fork 40 which slides on a rod 41 located fore and aft of the machine. The gear 37 is one tooth smaller than the gear 27, which in turn is connected to a disc 34.

To the drum 31 is attached an enlarged sleeve 38 which is formed on the outer end thereof the gear 20 or 21 as the case may be as the mechanism for winding and unwinding is a duplicate mechanism and may be used reversibly.

It will be understood that the entire mechanism consisting of the gearing, cam member and drum will be moved slowly backwardly and forwardly for the winding of the wire, and the unwinding thereof.

In laying out the cam groove I find it desirable to extend the groove from a point near the front end of the cylinder 25 to a point on the rear end on the other side of the cylinder and thence continuing around and back in a like manner to the place of starting the groove. This groove is equal in length to the circumference of the cylinder added to double the width of the face of the drum between its flanges.

In arriving at the number of teeth for the gear 37, I select a gear having one less tooth than the nearest digit found by dividing double the measurement of the face of the drum between its flanges by the measurement of the diameter of a wire to be used in the machine plus an allowance for spacing of the wires which is about twelve percent of the diameter of the drum.

From the foregoing construction, when the drum is being driven and when the wire is being unwound the drum reciprocates on the shaft 4. As the gear 37 is non-rotative and as the gears 37 and 27 have an unequal amount of teeth, the association therewith of the pinions 36 and 28 forms a planetary gearing for the movement of the associated gearing about its own axis and about the main axis of the shaft 4, thus securing the proper reciprocation and rotation of the drum 31 for the even winding and unwinding of the wire. As will be hereinafter described, the purpose of this reciprocation is to maintain the wire in exact alignment with the sheave on which it is looped, thus preventing any twisting or undue tension on the wire.

The motor used for this driving operation of winding is what is known as a variable speed motor having a capacity approximately double the power necessary for operating the drums, thus being able to keep a tension on the wire and being able to assist the sheaves in driving the last loop of wire across the cutting pulleys, the sheaves being driven by a constant speed motor. Thus with the variable speed motor we have a motor which will carry its normal load at approximately half of its speed, but with less than its normal load it will increase its speed or without its load it will run at full rate of speed. The drum face is run at a peripheral speed slightly greater than the peripheral speed of the pulleys. Thus the pulling drum exerts a constant tension on the wire when the machine is in operation and slows down in speed as the wire piles up on its face without greatly increasing its tension and without overheating the motor.

Swinging from the cradle carrying the motor a driving gear may be positioned by the following mechanism. A handle 10 is carried on the bottom of the cradle 9. This handle has connected thereto thumb pins 42 mounted on the lever 43 which is pivoted on the main lever 10 at 44. The outer end of the lever 43 has connected thereto a link 45 connected to a block 46 which slides on the lever 10. This block is held in its uppermost position normally by the helical spring 47 connected thereto which has its upper end suspended on a pin 48 which is mounted upon a depending block 49 hung on the bottom of the swinging cradle.

This block 49 has outwardly extending wings 51 which are pivotally mounted as at 52 to the locking arms 53. These arms have notches 54 in their sides and notched ends 55 for engaging with the shaft 4 to maintain the mechanism in engaging position on one side or the other.

Figure 5:
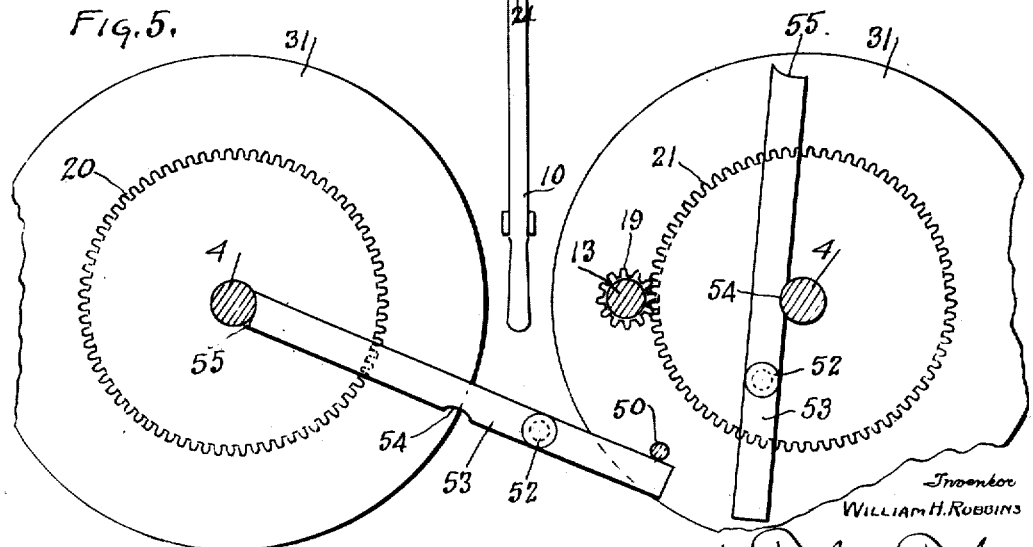
Figure 5 is an end elevation of such mechanism showing the locking means diagrammatically in its several positions in locking and locked positions.

These locking arms 53 are unlocked by the descent of the pin 50 which comes in contact with the lower end of said arms when the block 46 is pulled downwardly carrying with it the finger 56 which carries the pin 50. The depression of the lower end of the locking arms 53 when in locked position as shown on the left hand side of Figure 5, serves to disengage the end 55 from the shaft 4, permitting the cradle to swing to its neutral position and also permitting it to be moved to a position where the other train of gears and drum will be engaged with the source of power.

It is thus possible by the swinging of the cradle to move it either into neutral position or to a position to drive either means. It will automatically lock in such a position.

The drum which is acting as the unwinding drum is provided with a brake to prevent the too rapid unwinding of the wire from the drum.

This brake mechanism consists of a vertical rod 132 which is adapted to turn in a supporting bracket 133 rigidly secured to the diagonal member 39. The upper end of this rod is threaded for a distance below and above the bracket 133 and carries the brake member 134 which is provided with a wearing shoe 135 for engagement with the periphery of the drum 31. The lower end of the rod 132 has a hand wheel 136 for the purpose of operating the brake and its shoe to cause the drum to be retarded or to allow of its free movement in winding or unwinding the strands of wire.

*Wire guiding mechanism.*

The next step in the manufacture of steel wool is to convey the wire in a plurality of parallel loops adjacent cutting tools. It is new in the art so far as I know to provide a large number of parallel loops of wire of a single continuous strand adapted to be actuated upon simultaneously by the same cutting tools and maintained each in the same relationship to the cutting tool with each other.

For this purpose I provide first of all a pair if vertical standards 57. Upon these standards is mounted a transverse table 58. Upon either end of this table there is mounted a transverse shaft 59 carrying a sheave 60 which is provided with a flange as 61 and grooves 62 so that the desired number of wires will lie upon the face of the sheave in parallel relationship in substantially the same plane and in line with the grooves in the wire guide to be hereinafter described which are suspended from the table 58.

These sheaves are driven by any desired form of worm and gears located in the gear box 63 from a shaft 64 connected to the armature shaft of a motor 65 mounted on the table between the sheaves at the opposite ends of the table. Between the gear and the motor I prefer to insert a clutch or flexible coupling member 64ª to maintain the driving mechanism in alignment to compensate for any disalignment of the parts. This motor 65 is a constant speed motor.

The wire arranged in some seven loops thus presents to the cutting tools seven separate wires. It is obvious that in such an arrangement one wire which is first engaged with the cutting tools might be cut to a greater degree than the next succeeding wire. As the ends of the tool are horizontal or straight edged, this would result in uneven cuts being taken on the several parallel strands which I desire to avoid. I do avoid this condition by providing a rocking or floating guide for these wires which will maintain them in equidistant relationship one from the other and in equidistant relationship with respect to the cutting edges of the several tools. This floating guide permits the wires to be rocked as a unit by the major axis of the guide, tilting the group of wires so that they will be maintained equidistant from the cutting edges.

This construction is shown in some detail in Figures 10, 14, 15, 16, 17, 18 and 19.

The table is approximately T-shaped. The horizontal portion of the table marked 66 has a semi-circular groove cut in the lower face thereof designated 67. In this groove is a guide support 68 having a semi-circular back so that it may rock in the groove. The face of this support 68 is cut away as at 69 to receive the guide plates 70 which have a plurality of grooves 71 for receiving the wires.

This rocking guide support 67 is supported in the table by the spaced adjusting screws 72 which have their lower threaded ends 73 threaded into the upper convex surface of the rocking guide support. The upper end of the supporting screws are formed into heads 74. The screws themselves are loosely fitted in the table having a space 75 between the supporting screws and the table to permit the screws to rock with the guide support which rocks about its major axis in the table. These screws 72 are provided with transversely arranged pins 76 carrying sleeves or rollers 77 which roll upon semi-circular cam surfaces 78 carried on either side of the screws on the top of the table beneath the roller 77 so that as the guide support rocks it is maintained in such frictional engagement with the table as desired but always in a predetermined position about the major axis which is the axis of rotation.

The guide blocks proper may be supported by pins 79 in the guide support.

These guides are spaced from one another at predetermined intervals.

In order to keep the wires in position in the guides, three pressure rollers are employed located one at either end of the table and one in the center thereof. Such pressure rollers are seen illustrated in some detail in Figures 19, 20 and 21. 80 designates a pressure roller mounted upon a shaft 81 in such a position that the rollers engage the underside of the seven parallel wires maintaining them in engagement with the wire guides.

The shaft 81 is eccentrically mounted in the eccentric bushing or sleeve 82 in the depending or vertical portion 83 of the table. At the back of the table the shaft 81 has mounted thereon an arm 84 by an adjustable split collar 85, the position of which can be adjusted by setting the bolt 86 which clamps the collar to the shaft 81. The arm 84 carries spring arms 87 which extend to a distance from the collars. These arms are connected to one another by the links 88, 89, lever 90, spring arm 91. The lever 90 is pivoted at 92 to the standard 57. The point of pivoting is between the pivotal connection of 91 to 90 as at 93 and the pivotal connection of 89 to 90 as at 94. The exact position of the several parts to the rollers is fixed by inserting a pin through the arm 91 and an arcuate bracket 95 which has equidistant holes 96. This bracket is mounted on the standard 57.

By changing the position of the eccentric sleeve 82 which has a projecting head 97, the exact relationship of the roller 80 to the wires can be determined.

By operating the handle or lever 90 the rollers may be thrust into engaging position or disengaging position simultaneously.

*Cutting mechanism.*

It is one of the features of my invention to provide cutting tools in groups, preferably pairs, so that either one of the tools in any pair may be used depending upon the direction in which the wires are traveling. It is a further object as hereinbefore explained to be able to run the wires in one direction and then reverse and run them in the other direction until they are completely worn out or until so near so that the wire cannot be used further.

These tools are rectangular pieces of metal having bevelled cutting edges the flat faces of the tool being formed in a plurality of closely or equally spaced grooves, so that the cutting edge is formed into a series of teeth where the bevelled edge intercepts at an angle to the ridges between the grooves. Such tools will be seen illustrated in the accompanying drawings.

Referring to Figures 9, 10, 11, 12, 13, 26 and 27 it will be seen that a plurality of groups of cutting tools have been provided consisting of two tools to a group. It is essential in such an arrangement to have means of adjusting the tools independently, means of rocking the tools to throw them in engagement with the wires alternately, and means of rocking the tools about the axis of the supporting shaft together with the tool holder. It is also essential to have some means of removing the tool without disturbing the adjustments. It is further desirable to have means of adjusting the position of the tools in the position of the tool holder.

Referring to the drawings in detail, 98 is a shaft mounted in the eccentric bushing 99 carried in the table in a horizontal position. This shaft is connected to the rear of the table to an arm 99 by a split collar 100, clamping shaft 98 and the bolt 101. The arm 99 has attached thereto a spring arm 102. Each of these spring arms 102 are connected to a transverse interconnecting link 103 so that the arms will be moved in synchronism. This link is connected to an operating link 104 which is pivoted to the end of a lever 105. This lever 105 is pivoted midway of its length upon the vertical standard 57 as at 106. The upper end of this lever has a handle 107 for its operation. Thus the shafts 98 may be rotated in unison and all the tools on one side brought into engagement with the wires or all of the tools on the other disengaged or all tools brought to disengaging position.

In order to secure a final adjustment of the position of the shafts vertically in the table, I provide means of rotating the eccentric bushings 99 through the arms 108 which are connected to engage collars on said bushings designated 109 at the rear end of the bushings to the rear of the table. These arms 108 are connected to a transverse member 110 which is operated by a threaded link 111. The link 111 passes through an eye 112 on the vertical standard 57. On either side of this eye are the adjusting screws 113 and 114, which serve to definitely position the threaded link 111, and prevent any further movement of the eccentric bushings.

Turning to the details of the supports for the cutting tools, it will be observed that the end of the shaft as will be seen more clearly in Figure 26, is provided with a pair of outwardly extending U-shaped arms 115. At the base of these arms there are laterally extending striker blocks parallel to the table marked 116. These striker blocks 116 are engaged by the set screws 117 which project through the table and serve to determine the position as well as the degree of angle of rotation of the shaft and the arms 115.

Screws 118 lock in position the screws 117.

The jaws 115 are cut away as at 119.

This is more clearly seen in the front elevation in Figure 27 where all the parts have been removed except the table, the set screws and jaws 115 and the striker blocks 116.

The jaws are also cut away on their under side as at 120.

Between these jaws is located the tool holder screw. This screw has a block 121 threaded on the bottom thereof. The screw itself is designated 122 and the tool holder proper is designated 123. The jaws 115 are clamped between the nut 121 and the tool holder proper 123.

The tool holder has an L-shaped recess cut in the face thereof as at 124 to receive the cutting tool 125 which is held in position by the L-shaped clamp 126 retained on the tool holder by the bolts 127.

As to the individual tools, it will be seen that they are provided with bevelled edges 128 and toothed cutting edges 129 formed by the ridges 130 between the grooves 131.

The finer the grooves, the finer the cut and resultant wool.

The cutting tools are grooved longitudinally on the flat side which is placed toward the wire. The cutting end of the tool is bevelled by grinding and honing from the side which is placed farthest from the wire to a fine edge along which numerous teeth project, due to the grooves on the other side. The grades of metal wool are determined by the fineness and proximity to each other of these teeth, which in turn are determined by the number of grooves in the tool. These vary in practice from 48 to 200 grooves across the inch of flat surface of the tool.

The fineness of the grade is further determined by the degree of pressure with which the tools are brought in contact with the wire. It is desirable that when cutting coarse wool the tools be set to form a greater angle with the wire than in cutting fine wool, and this machine provides a means for accomplishing this.

The machine is threaded with wire from either side in the following manner. If from the right, the wire is passed under the right hand sheave over the right hand roller under and along the rear groove in the guide to the bottom of the left hand sheave passing over the center and left hand rollers. It is then passed half around the left hand sheave in the sheave's rearmost groove and carried back horizontally to the top of the right hand sheave and half way around and down the right hand sheave in its groove next to the one at the rear, thence again along the second groove in the guide and half way up around the left hand sheave. This operation is repeated until all of the grooves in the guide and the left hand sheave are filled with wire.

The end of the wire is then passed upward to the left hand drum and through a hole in its face. It is then secured to the drum and the machine is ready to operate by starting both motors and setting the rollers and the right hand tools against the moving wire. Now were the guide and guide holder fixed rigidly to the table, wool would be cut from the first and second loops of wire passing under the guide, the wire of the succeeding loops being reduced in depth by the previous cuts so that the tools would not be in proper contact for cutting. However, the guide is half round in construction and is seated in the table so that it oscillates when greater pressure is brought at its rear side than at its front and vice versa. The axis of this oscil'ation is the center groove of the guide. The rollers exert pressure against the cut or flat side of the part of each loop of wire passed under the guide so that as the cutting operation progresses the rear of the guide is slightly raised and the front slightly lowered, keeping the flat sides of all loops in the same horizontal plane and in even contact with the tools.

When the wire is unwound from its original coil the machine is stopped, and the end of the wire which has not passed through is brought up half around the right hand pulley in its rear groove and is attached through the face of the right hand drum. The motors are then reversed, the right hand tools disengaged, the right hand drum placed in gear and the machine started and the left hand tools engaged. The machine is operated in each direction alternately until the wire is cut down to a point where it will no longer stand the strain of being drawn across the tools.

It will be understood that I desire to comprehend within my invention such modifications which may be necessary to adapt it to varying conditions of use.

Having thus fully described my invention, what I claim as new and desire to secure by Letters Patent, is:—

1. In a machine for manufacturing steel wool, drums mounted therein, means for moving from a single drum a plurality of strands of wire parallel to one another for the simultaneous cutting of wool therefrom by the same tools, cutting tools, and movable means to guide said strands to maintain them in a predetermined position for the cutting of an equal amount of wool from each of the strands.

2. In a machine for manufacturing steel wool, drums mounted therein, means for moving from a single drum a plurality of strands of wire parallel to one another for the simultaneous cutting of wool therefrom by the same tools, cutting tools, movable means to guide said strands to maintain them to maintain them in a predetermined position for the cutting of an equal amount of wool from each of the strands, and means to guide said wires.

3. In a machine for manufacturing steel wool, means for moving a plurality of strands of wire parallel to one another for the simultaneous cutting of wool therefrom by the same tools, cutting tools, means to guide said strands to maintain them in a predetermined position for the cutting of an equal amount of wool from each of the strands, and means to guide said strands, said guiding means being adapted to accommodate itself to the varying thicknesses of the wire to maintain the strands in equidistant relationship from the cutting tools.

4. In a machine for manufacturing steel wool, means for moving a plurality of strands of wire parallel to one another for the simultaneous cutting of wool therefrom by the same tools, cutting tools, means to drive said moving means at a constant speed and means to wind and unwind the wire at a variable speed and uniform tension.

5. In a machine for manufacturing steel wool, means for moving a plurality of strands of wire parallel to one another for the simultaneous cutting of wool therefrom by the same tools, cutting tools, means to guide said strands to maintain them in a predetermined position for the cutting of an equal amount of wool from each of the strands, means to support said strands, said guiding means being adapted to accommodate itself to the varying thicknesses of the wire to maintain the strands in equidistant relationship from the cutting tools, and means to support said strands, said means being located at a plurality of spaced intervals, said supports maintaining the strands in engagement with the guiding means.

6. In a machine for manufacturing steel wool, means for moving a plurality of strands of wire parallel to one another for the simultaneous cutting of wool therefrom by the same tools, cutting tools, means to guide said strands to maintain them in a predetermined position for the cutting of an equal amount of wool from each of the strands, means to support said strands, said guiding means being adapted to accommodate itself to the varying thicknesses of the wire to maintain the strands in equidistant relationship from the cutting tools, said supporting means being located at a plurality of spaced intervals, said supports maintaining the strands in engagement with the guiding means, and means for the simultaneous adjustment of said supports.

7. In a machine for manufacturing steel wool, means for moving a plurality of strands of wire parallel to one another for the simultaneous cutting of wool therefrom by the same tools, cutting tools, means to guide said strands to maintain them in a predetermined position for the cutting of an equal amount of wool from each of the strands, means to support said strands, said guiding means being adapted to accommodate itself to the varying thicknesses of the wire to maintain the strands in equidistant relationship from the cutting tools, said means being located at a plurality of spaced intervals, said supports maintaining the strands in engagement with the guiding means, means for the simultaneous adjustment of said supports, and means for the simultaneous application of said cutting tools.

8. In a machine for manufacturing steel wool, means for moving a plurality of strands of wire parallel to one another for the simultaneous cutting of wool therefrom by the same tools, cutting tools, means to guide said strands to maintain them in a predetermined position for the cutting of an equal amount of wool from each of the strands, said guiding means being adapted to accommodate itself to the varying thicknesses of the wire to maintain the strands in equidistant relationship, from the cutting tools, means to support said strands, said means being located at a plurality of spaced intervals, said supports maintaining the the strands in engagement with the guiding means, means for the simultaneous adjustment of said supports, means for the simultaneous application of said cutting tools, and means to independently adjust each of said tools.

9. In a machine for manufacturing steel wool, means for moving a plurality of strands of wire parallel to one another for the simultaneous cutting of wool therefrom by the same tools, cutting tools, means to guide said strands to maintain them in a predetermined position for the cutting of an equal amount of wool from each of the strands, said guiding means being adapted to accommodate itself to the varying thicknesses of the wire to maintain the strands in equidistant relationship from the cutting tools, means to support said strands, said means being located at a plurality of spaced intervals, said supports maintaining the wires in engagement with the guiding means, means for the simultaneous adjustment of said supports, means for the simultaneous application of said cutting tools, and means to independently adjust each of said tools.

10. In a machine for manufacturing steel wool, drums mounted therein, means for moving from a single drum a plurality of strands of wire parallel to one another for the simultaneous cutting of wool therefrom by the same tools, cutting tools, and movable means to guide said strands to maintain them in a predetermined position for the cutting of an equal amount of wool from each of the strands, said means for actuating the strands including means for reversing the direction of movement of the strands, and said tools being so arranged in groups for the alternate application of parts of the group depending upon the direction of movement of the strands.

11. In a machine for manufacturing steel wool, means for moving a plurality of strands of wire parallel to one another for the simultaneous cutting of wool therefrom by the same tools, cutting tools, means to guide said strands to maintain them in a predetermined position for the cutting of an equal amount of wool from each of the strands, said means for actuating the strands including means for reversing the direction of movement of the strands, said tools being so arranged in groups for the alternate application of parts of the groups depending upon the direction of movement of the strands, and means to simultaneously effect the application of corresponding parts of each group of tools to the wire or to simultaneously render all of the tools inoperative.

12. In a machine for manufacturing steel wool, means for moving a plurality of strands of wire parallel to one another for the simultaneous cutting of wool therefrom by the same tools, cutting tools, and means to guide said strands to maintain them in a predetermined position for the cutting of an equal amount of wool from each of the strands, said means for actuating the strands consisting of means for reversing the direction of movement of the strands, and said tools being so arranged in groups for the alternate application of parts of the group depending upon the direction of movement of the strands, means to simultaneously effect the application of corresponding parts of each group of tools to the wire or to simultaneously render all of the tools inoperative, and means for independently adjusting each group of tools.

13. In a machine for manufacturing steel wool, means for moving a plurality of strands of wire parallel to one another for the simultaneous cutting of wool therefrom by the same tools, cutting tools, and movable means to guide said strands to maintain them in a predetermined position for the cutting of an equal amount of wool from each of the strands, said strands being formed from a single wire.

14. In a machine for manufacturing steel wool, means for moving a plurality of strands of wire parallel to one another for the simultaneous cutting of wool therefrom by the same tools, cutting tools, movable means to guide said strands to maintain them in a predetermined position for the cutting of an equal amount of wool from each of the strands, and means to guide said strands in the parallel relationship, said strands being a part of a continuous wire.

15. In a machine for manufacturing steel wool, means for moving a plurality of strands of wire parallel to one another for the simultaneous cutting of wool therefrom by the same tools, cutting tools, means to guide said strands to maitain them in a predetermined position for the cutting of an equal amount of wool from each of the strands, and movable means to guide said strands in parallel relationship, said strands being a part of a continuous strand, said means for moving said strands consisting of winding means and unwinding means and means for the actuation thereof.

16. In a machine for manufacturing steel wool, means for moving a plurality of strands of wire parallel to one another for the simultaneous cutting of wool therefrom by the same tools, cutting tools, movable means to guide said strands to maintain them in a predetermined position for the cutting of an equal amount of wool from each of the strands, and means to guide said strands in parallel relationship, said strands being a part of a continuous wire, said means for moving said strands consisting of winding means and unwinding means and means for the actuation thereof, and means to drive said wire guiding means.

17. In a machine for manufacturing steel wool, a table, cutting tools arranged adjacent thereto, means to guide a plurality of parallel strands formed from a single wire adjacent said tools over said table, said means consisting of sheaves over which the strands are looped at either end of said table, and means for driving said sheaves to move said wires independently of the pull of the wire thereon.

18. In a machine for manufacturing steel wool, a table, cutting tools arranged adjacent thereto, means to guide a plurality of parallel strands formed from a single wire adjacent said tools over said table, said means consisting of sheaves over which the strands are looped at either end of said table, and means for driving said sheaves to move said strands, and means for unwinding said wire before cutting and rewinding after cutting, and means for independently driving said winding mechanism.

19. In a machine for manufacturing steel wool, a table, cutting tools arranged adjacent thereto, means to guide a plurality of parallel strands formed from a single wire adjacent said tools over said table, said means consisting of sheaves over which the strands are looped at either end of said table, means for driving said sherves to move said strands, means for unwinding said wire before cutting and rewinding after cutting, means for independently driving said winding means, and means for maintaining said winding and unwinding means at the point of unwinding or winding the wire in parallelism with said sheaves to prevent twisting or warping of the wire.

20. In a machine for manufacturing steel wool, a table, cutting tools arranged adjacent thereto, means to guide a plurality of parallel strands formed from a single wire adjacent said tools over said table, said means consisting of sheaves over which the strands are looped at either end of said table, means for driving said sheaves to move said strands, means for unwinding said wire before cutting and rewinding after cutting, means for independently driving said winding means, means for maintaining said winding and unwinding means at the point of unwinding or winding the wire in parallelism with said sheaves to prevent twisting or warping of the wire, and means associated with said table for adjustably maintaining said strands in equidistant relationship with respect to said cutting tools.

21. In a machine for manufacturing steel wool, a table, cutting tools arranged adjacent thereto, means to guide a plurality of parallel strands formed from a single wire adjacent said tools over said table, said means consisting of sheaves over which the strands are looped at either end of said table, means for driving said sheaves to move said strands, means for unwinding said wire before cutting and rewinding after cutting, means for independently driving said winding means, means for maintaining said winding and unwinding means at the point of unwinding or winding the wire in parallelism with said sheaves to prevent twisting or warping of the wire, means associated with said table for adjustably maintaining said strands in equidistant relationship with respect to said cutting tools, and means to support said strands in relation to said guide and said tools.

22. In a machine for manufacturing steel wool, a table, cutting tools arranged adjacent thereto, means to guide a plurality of parallel strands formed from a single wire adjacent said tools over said table, said means consisting of sheaves over which the strands are looped at either end of said table, means for driving said sheaves to move said strands, means for unwinding said wire before cutting and rewinding after cutting, means for independently driving said winding means, means for maintaining said winding and unwinding means at the point of unwinding or winding the wire in parallelism with said sheaves to prevent twisting or warping of the wire, means associated with said table for adjustably maintaining said strands in equidistant relationship with respect to said cutting tools, means to support said strands in relation to said guide and said tools, and means to reverse the direction of movement of said wire.

23. In a machine for manufacturing steel wool, a table, cutting tools arranged adjacent thereto, means to guide a plurality of parallel strands formed from a single wire adjacent said tools over said table, said means consisting of sheaves over which the strands are looped at either end of said table, means for driving said sheaves to move said strands, means for unwinding said wire before cutting and rewinding after cutting, means for independently driving said winding means, means for maintaining said winding and unwinding means at the point of unwinding or winding the wire in parallelism with said sheaves to prevent twisting or warping of the wire, means associated with said table for adjustably maintaining said strands in equidistant relationship with respect to said cutting tools, means to support said strands in relation to said guide and said tools, means to reverse the direction of movement of said wire, and means to simultaneously adjust said supports.

24. In a machine for manufacturing steel wool, a table, cutting tools arranged adjacent thereto, means to guide a plurality of parallel strands formed from a single wire adjacent said tools over said table, said means consisting of sheaves over which the strands are looped at either end of said table, means for driving said sheaves to move said strands, means for unwinding said wire before cutting and rewinding after cutting, means for independently driving said winding means, means for maintaining said winding and unwinding means at the point of unwinding or winding the wire in parallelism with said sheaves to prevent twisting or warping of the wire, means associated with said table for adjustably maintaining said strands in equidistant relationship with respect to said cutting tools, means to support said strands in relation to said guide and said tools, means to reverse the direction of movement of said wire, and means to simultaneously adjust said supports, and means to simultaneously reverse the position of the cutting tools.

25. In a machine for manufacturing steel wool, a table, cutting tools arranged adjacent thereto, means to guide a plurality of parallel strands formed from a single wire adjacent said tools over said table, said means consisting of sheaves over which the strands are looped at either end of said table, means for driving said sheaves to move said strands, means for unwinding said wire before cutting and rewinding after cutting, means for independently driving said winding means, means for maintaining said winding and unwinding means at the point of unwinding or winding the wire in parallelism with said sheaves to prevent twisting or warping of the wire, means associated with said table for adjustably maintaining said strands in equidistant relationship with respect to said cutting tools, means to support said strands in relation to said guide and said tools, means to reverse the direction of movement of said wire, means to simultaneously adjust said supports, means to simultaneously reverse the position of the cutting tools, and means to simultaneously effect an adjustment of the position of the cutting tools.

26. In a machine for manufacturing steel wool, a table, cutting tools arranged adjacent thereto, means to guide a plurality of parallel strands formed from a single wire adjacent said tools over said table, said means consisting of sheaves over which the strands are looped at either end of said table, means for driving said sheaves to move said strands, means for unwinding said wire before cutting and rewinding after cutting, means for independently driving said winding means, means for maintaining said winding and unwinding means at the point of unwinding or winding the wire in parallelism with said sheaves to prevent twisting or warping of the wire, means associated with said table for adjustably maintaining said strands in equidistant relationship with respect to said cutting tools, means to support said strands in relation to said guide and said tools, means to reverse the direction of movement of said wire, means to simultaneously adjust said supports, means to simultaneously reverse the position of the cutting tools, and mean to simultaneously effect an adjustment of the position of the cutting tools, said tools being arranged in pairs for alternate application to the strands and having means for independent adjustment in each group.

27. In a machine for manufacturing steel wool, a table, cutting tools arranged adjacent thereto, means to guide a plurality of parallel strands formed from a single wire adjacent said tools over said table, said means consisting of sheaves over which the strands are looped at either end of said table, means for driving said sheaves to move said strands, means for unwinding said wire before cutting and rewinding after cutting, means for independently driving said winding means, means for maintaining said winding and unwinding means at the point of unwinding or rewinding the wire in parallelism with said sheaves to prevent twisting or warping of the wire, means associated with said table for adjustably maintaining said strands in equidistant relationship with respect to said cutting tools, means to support said strands in relation to said guide and said tools, means to reverse the direction of movement of said wire, means to simultaneously adjust said supports, means to simultaneously reverse the position of the cutting tools, and means to simultaneously effect an adjustment of the position of the cutting tools, said tools being arranged in pairs for alternate application to the strands and having means for independent adjustment in each group, said guide being cut away adjacent the cutting tools and supports so as not to engage the wire at such points where the strands are in contact with the cutting tools and supports.

28. In a machine for manufacturing steel wool, a table, pulleys at either end of the table, said pulleys having their faces grooved to accommodate a plurality of parallel loops of a single length of wire, means to drive said pulleys in synchronism independently of the pull of the wire thereon, means to supply said wire to one of said pulleys, and means to wind said wire from the other said pulleys, and means to drive said winding means 29. In a machine for manufacturing steel wool, a table, pulleys at either end of the table, said pulleys having their faces grooved to accommodate a plurality of parallel loops of a single length of wire, means to drive said pulleys in synchronism, means to supply said wire to one of said pulleys, means to wind said wire from the other of said pulleys, and means to drive said winding means, said pulley driving means being a constant speed motor and said winding driving means being a variable speed motor.

30. In a machine for manufacturing steel wool, a table, pulleys at either end of the table, said pulleys having their faces grooved to accommodate a plurality of parallel loops of a single length of wire, means to drive said pulleys in synchronism, means to supply said wire to one of said pulleys, means to wind said wire from the other of said pulleys, means to drive said winding means, said pulley driving means being a constant speed motor and said winding driving means being a variable speed motor, and means to move said variable speed motor from engagement with the unwinding means to reverse the direction of movement of the wire.

31. In a machine for manufacturing steel wool, a table, a floating guide in said table having a plurality of spaced grooves for receiving a plurality of parallel strands of wire correspondingly grooved pulleys at either end of said table for guiding and actuating a single length of wire looped over said pulleys, the grooves in said pulleys being in line with the grooves in said guide, means to actuate said pulleys, means to support said wire in engagement with said guide, cutting tools adjacent said wire, said guide being cut away adjacent said tools and supports.

32. In a machine for manufacturing steel wool, a table, a floating guide in said table having a plurality of spaced grooves for receiving a plurality of parallel strands of wire, correspondingly grooved pulleys at either end of said table for guiding and actuating a single length of wire looped over said pulleys, the grooves in said pulleys being in line with the grooves in said guide, means to actuate said pulleys, means to support said wire in engagement with said guide, cutting tools adjacent said wire, said guide being cut away adjacent said tools and supports, means for winding and means for unwinding the single length of wire, means for reversing the direction of said wire in its movement by reversing the application of power to said winding and unwinding means, and means for reversing the position of the cutting tools.

33. In a machine for manufacturing steel wool, a table, a floating guide in said table having a plurality of spaced grooves for receiving a plurality of parallel strands of wire, correspondingly grooved pulleys at either end of said table for guiding and actuating a single length of wire looped over said pulleys, the grooves in said pulleys being in line with the grooves in said guide, means to actuate said pulleys, means to support said wire in engagement with said guide, cutting tools adjacent said wire, said guide being cut away adjacent said tools and supports, means for winding and means for unwinding the single length of wire, means for reversing the direction of said wire in its movement by reversing the application of power to said winding and unwinding means, and means for reversing the position of the cutting tools, the power for driving the pulleys being a constant speed motor and the power for driving the winding means being a variable speed motor.

34. In a machine for manufacturing steel wool, a table, a floating guide in said table having a plurality of spaced grooves for receiving a plurality of parallel strands of wire, correspondingly grooved pulleys at either end of said table for guiding and actuating a single length of wire looped over said pulleys, the grooves in said pulleys being in line with the grooves in said guide, means to actuate said pulleys, means to support said wire in engagement with said guide, cutting tools adjacent said wire, said guide being cut away adjacent said tools and supports, means for winding and means for unwinding the single length of wire, means for reversing the direction of said wire in its movement by reversing the application of power to said winding and unwinding means, means for reversing the position of the cutting tools, the power for driving the pulleys being a constant speed motor and the power for driving the winding means being a variable speed motor, and means to lock and unlock the variable speed motor in engagement with the alternate winding means.

35. In a machine for manufacturing steel wool, a table, a guide therein, grooved to receive a plurality of parallel loops of a wire, pulleys grooved to receive said loops, the grooves and the tools being in line with the grooves in the guide, means to drive said pulleys, means to unwind said single length of wire, means to wind said single length of wire, means to maintain said wire in line with said pulleys to prevent the warping or twisting thereof, and means to cut simultaneously the plurality of loops of wire by a plurality of tools, each tool engaging with all loops of the wire.

36. In a machine for manufacturing steel wool, means for forming the wool from a wire, means for winding and unwinding said wire, consisting of a supporting frame, a pair of spaced drums for use as alternate winding and unwinding drums adapted to reciprocate on said frame, a motor supported on said frame between said drums adapted to be swung from side to side to engage said drums and the mechanism alternately, driving mechanism for connecting said motor and either of said drums, means in said drums to reciprocate either fore and aft of the drum on the frame, and planetary gearing in said drums.

37. In a machine for manufacturing steel wool, means for forming the wool from a wire, means for winding and unwinding said wire, consisting of a supporting frame, a pair of spaced drums for use as alternate winding and unwinding drums adapted to reciprocate on said frame, a motor supported on said frame between said drums and the mechanism alternately, driving mechanism for connecting said motor and either of said drums, means in said drums to reciprocate either fore and aft of the drum on the frame, and planetary gearing in said drums, and means for locking said motor and the driving mechanism in engagement with either of said drums, whereby the direction of movement of the wire may be reversed.

38. In a machine for manufacturing steel wool, means for forming the wool from a wire, means for winding and unwinding said wire, consisting of a supporting frame, a pair of spaced drums for use as alternate winding and unwinding drums adapted to reciprocate on said frame, a motor supported on said frame between said drums adapted to be swung from side to side to engage said drums and the mechanism alternately, driving mechanism for connecting said motor and either of said drums, means in said drums to reciprocate either fore and aft of the drum on the frame, and planetary gearing in said drums, said motor being a variable speed motor having a mechanism of approximately double the power necessary for operating the drums and adapted to carry its normal load at approximately half of its rate of speed, whereby with less than its normal load the speed will increase and the greater the load the slower the speed so that a constant tension is maintained on the wire in moving it through the wool making machine.

39. In a machine for manufacturing steel wool, apparatus for making steel wool, a frame for supporting winding and unwinding means for moving wire through the machine consisting of parallel winding and unwinding drums adapted to be used for either purpose, a motor swung in a cradle therebetween, a pinion on said motor, gearing connected thereto adapted to engage the reciprocating driving mechanism of either drum, a shaft for supporting either drum and its mechanism consisting of a cam having a spiral groove therein, an arm mounted on said shaft with a roller engaging with said cam to reciprocate the gearing and the drum, a sleeve attached to said drum mounted over said cam having an external gear on one end opposite the drum, a gear on said cam sleeve, a pinion meshing with said gear carried by said drum, a second pinion connected thereto on the opposite side of said drum and turning therewith, a stationary gear adapted to reciprocate on said shaft having an arm connected thereto engaging with the frame to slide thereon but adapted to maintain the gear in stationary position, said gear having one tooth less than the gear on the cam sleeve, whereby the drums reciprocate as well as rotate, the motor gearing being adapted to engage during reciprocation with the gear carried on the sleeve supported by the drum.

40. In a steel wool machine, a reciprocating wire carrying drum consisting of a stationary supporting shaft, a cam sleeve, a stationary arm on the shaft having a roller engaging in the cam groove in the cam sleeve, a gear on said cam sleeve engaging a pinion on the drum, a shaft on said drum carrying said pinion, a second pinion on said shaft, a stationary gear on the first mentioned shaft engaging with said last mentioned pinion, said gear and the gear on the cam sleeve having a different number of teeth to secure a planetary gearing result, a driving gear on said drum for actuating it, whereby the drum will rotate and reciprocate, said stationary gear having one less tooth than the nearest digit secured by dividing double the measurement of the face of the drum between its flanges by the measurement of the diameter of the wire to be used in the machine, plus an allowance for spacing of the wire of about twelve percent of the diameter of the wire.

41. In a steel wool machine, a reciprocating wire carrying drum consisting of a stationary supporting shaft, a cam sleeve, a stationary arm on the shaft having a roller engaging in the cam groove in the cam sleeve, a gear on said cam sleeve engaging a pinion on the drum, a shaft on said drum carrying said pinion, a second pinion on said shaft, a stationary gear on the first mentioned shaft engaging with said last mentioned pinion, said gear and the gear on the cam sleeve having a different number of teeth to secure a planetary gearing result, a driving gear on said drum for actuating it, whereby the drum will rotate and reciprocate, said stationary gear having one less tooth than the nearest digit secured by dividing double the measurement of the face of the drum between its flanges by the measurement of the diameter of the wire to be used in the machine plus an allowance for spacing, said cam groove being equal in length to the circumference of the cylinder added to double the width of the face of the drum between its flanges.

42. In a steel wool machine, means for forming steel wool, means for winding and unwinding the wire through the machine, consisting of a supporting frame, shafts carried by said frame to support winding and unwinding drums, a third shaft located between and above the first mentioned shafts for carrying a swinging cradle to support a driving motor for alternate application and also said drums and accompanying mechanism, rods parallel to said third shaft, yokes engaging said rods to slide thereon, the other end of said rods being connected to stationary gears mounted on the first mentioned shafts and reciprocating thereon, planetary gearing associated with said stationary gears in each of said drum mechanisms, and means to reciprocate said drums and accompanying mechanism.

43. In a steel wool machine, means for forming steel wool, means for winding and unwinding the wire through the machine, consisting of a supporting frame, shafts carried by said frame to support winding and unwinding drums, a third shaft located between and above the first mentioned shafts for carrying a swinging cradle to support a driving motor for alternate application and also said drums and accompanying mechanism, rods parallel to said third shaft, yokes engaging said rods to slide thereon, the other end of said rods being connected to stationary gears mounted on the first mentioned shafts and reciprocating thereon, planetary gearing associated with said stationary gears in each of said drum mechanisms, means to reciprocate said drums and accompanying mechanism, and braking mechanism for each of said drums adapted to be applied to the drum which is unwinding.

44. In a steel wool machine, means for forming steel wool, means for winding and unwinding the wire through the machine, consisting of a supporting frame, shafts carried by said frame to support winding and unwinding drums, a third shaft located between and above the first mentioned shafts for carrying a swinging cradle to support a driving motor for alternate application and also said drums and accompanying mechanism, rods parallel to said third shaft, yokes engaging said rods to slide thereon, the other end of said rods being connected to stationary gears mounted on the first mentioned shafts and reciprocating thereon, planetary gearing associated with said stationary gears in each of said drum mechanisms, and means to reciprocate said drums and accompanying mechanism, and braking mechanism for each of said drums adapted to be applied to the drum which is unwinding, said mechanism consisting of a brake shoe and a worm connected thereto for adjusting the engagement of the shoe.

45. In combination, a support, a swinging cradle on said support, shafts on either side of said support, when it is in its vertical position, a depending lever from said cradle, swinging arms pivoted on a block below said cradle, the ends of said arms being adapted to engage with either of said shafts, a pin adapted to engage the inner ends of said arms to unlock them from either of said shafts, and means mounted on said handle depending from the cradle adapted to reciprocate said pin, and yielding means for maintaining said pin and reciprocating means in inoperative position.

46. In a steel wool machine, a table having a vertical portion and a horizontal portion, a transverse shaft in the vertical portion, an eccentric bearing for said shaft, means for rotating said shaft consisting of a depending arm on one end, a supporting roller on the other end of said shaft, and an arm on said eccentric bearing for adjusting the position thereof in the table.

47. In a steel wool machine, a table having a vertical portion and a horizontal portion, a transverse shaft in the vertical portion, an eccentric bearing for said shaft, means for rotating said shaft consisting of a depending arm on one end and a supporting roller on the other end of said shaft, an arm on said eccentric bearing for adjusting the position thereof in the table, and a spring arm attached to the first mentioned arm for yieldingly maintaining said roller in engagement with wires passing through the machine.

48. In a machine for making steel wool, a table consisting of a vertical portion and a horizontal portion, a semi-circular groove in the underside of the horizontal portion, a semi-circular guide member adapted to rock therein, a plurality of spaced groove members carried in the lower face of said guide member, a plurality of spaced supporting screws threaded in said guide member and freely located in said table, rollers on said screws mounted transversely thereon, an arm, cam members mounted on the top of said table for supporting said rollers, whereby said guides may rock in the table and be adjustably engaged thereto.

49. In a machine for manufacturing steel wool, a guide for guiding a plurality of groups of wire in parallelism consisting of a table, a guide member adapted to rock therein, and a plurality of grooves in the outer face of the guide member.

50. In a machine for manufacturing steel wool, tool supports consisting of a horizontal shaft mounted in a table, an eccentric bearing for such shaft, an arm to rotate said shaft, jaws carried by the end of said shaft, striker blocks carried by the end of said shaft, a table in which said shaft is supported, screws adapted to engage and limit the movement of the striker blocks, a block for carrying oppositely disposed tools mounted in said jaws, means for clamping said tool support in said jaws, and clamps for holding said tools on the tool support.

51. In a machine for manufacturing steel wool, tool supports consisting of a horizontal shaft mounted in a table, an eccentric bearing for such shaft, an arm to rotate said shaft, jaws carried by the end of said shaft, striker blocks carried by the end of said shaft, a table in which said shaft is supported, screws adapted to engage and limit the movement of the striker blocks, a block for carrying oppositely disposed tools mounted in said jaws, means for clamping said tool support in said jaws, and clamps for holding said tools on the tool support, and means for rotating the eccentric bearing to vary the elevation of the tools, said shaft being so arranged that when it is rotated said tools will be alternately applied to wire passing through the machine.

52. In a machine for manufacturing steel wool, tool supports consisting of a horizontal shaft mounted in a table, an eccentric bearing for such shaft, an arm to rotate said shaft, jaws carried by the end of said shaft, striker blocks carried by the end of said shaft, a table in which said shaft is supported, screws adapted to engage and limit the movement of the striker blocks, a block for carrying oppositely disposed tools mounted in said jaws, means for clamping said tool support in said jaws, clamps for holding said tools on the tool support, and means to lock said adjusting screws for the striker blocks.

53. In a machine for manufacturing steel wool, a table, wire engaging means, a plurality of shafts for carrying said wire engaging means, an arm on each of said shafts, means to link said arms together, and means to simultaneously move said arms in unison to adjust the position of said wire engaging means.

54. In a machine for manufacturing steel wool, a table, a plurality of shafts for carrying wire engaging means, an arm on each of said shafts, means to link said arms together, and means to simultaneously move said arms in unison, eccentric bearings for each of said shafts, arms connected to said bearings, a link connecting said arms, and means for simultaneously adjusting each of said bearings for adjusting the elevation of the shafts.

55. In a machine for manufacturing steel wool, a table, cutting tools arranged adjacent thereto, means to guide a plurality of parallel strands of wire formed from a single length of wire adjacent said tools over said table, said means consisting of sheaves over which the strands are looped at either end of said table, and means for driving said sheaves to move said strands, and means for unwinding said length of wire before cutting and rewinding after cutting independent of the wire.

56. In a machine for manufacturing steel wool, means for forming the wool from a wire, means for winding and unwinding said wire, consisting of a supporting frame, a pair of spaced drums for use as alternate winding and unwinding drums adapted to reciprocate on said frame, a motor supported on said frame between said drums adapted to be swung from side to side to engage said drums and the mechanism alternately, driving mechanism for connecting said motor and either of said drums, means in said drums to reciprocate either fore and aft of the drum on the frame, and planetary gearing in said drums, said motor being a variable speed motor having a mechanism of greater power than necessary for operating the drums and adapted to carry its normal load at a fraction of its normal rate of speed, whereby with less than its normal load the speed will increase and the greater the load the slower the speed so that a constant tension is maintained on the wire in moving it through the wool making machine.

57. In a machine for manufacturing steel wool, a table, cutting tools arranged adjacent thereto, means to guide a plurality of parallel strands formed from a single wire in engagement with said tools over said table, and means to drive said guiding means so that each loop of wire will be independently driven by said guiding means whereby the driving strains will be applied to each loop independently against the resistance of the tools engaging the strand of wire of that loop.

In testimony whereof, I affix my signature.

WILLIAM H. ROBBINS.

winding and unwinding drums adapted to reciprocate on said frame, a motor supported on said frame between said drums adapted to be swung from side to side to engage said drums and the mechanism alternately, driving mechanism for connecting said motor and either of said drums, means in said drums to reciprocate either fore and aft of the drum on the frame, and planetary gearing in said drums, said motor being a variable speed motor having a mechanism of greater power than necessary for operating the drums and adapted to carry its normal load at a fraction of its normal rate of speed, whereby with less than its normal load the speed will increase and the greater the load the slower the speed so that a constant tension is maintained on the wire in moving it through the wool making machine.

57. In a machine for manufacturing steel wool, a table, cutting tools arranged adjacent thereto, means to guide a plurality of parallel strands formed from a single wire in engagement with said tools over said table, and means to drive said guiding means so that each loop of wire will be independently driven by said guiding means whereby the driving strains will be applied to each loop independently against the resistance of the tools engaging the strand of wire of that loop.

In testimony whereof, I affix my signature.

WILLIAM H. ROBBINS.

DISCLAIMER 1,584,145.—*William H. Robbins*, Springfield, Ohio. MACHINE FOR MAKING STEEL WOOL. Patent dated May 11, 1926. Disclaimer filed April 23, 1941, by the assignee, *The Williams Company*.

Hereby enters this disclaimer to claims 17, 18, 28, 55, and 57 of the specification.
[*Official Gazette May 20, 1941.*]

DISCLAIMER 1,584,145.—*William H. Robbins*, Springfield, Ohio. MACHINE FOR MAKING STEEL WOOL. Patent dated May 11, 1926. Disclaimer filed April 23, 1941, by the assignee, *The Williams Company*.

Hereby enters this disclaimer to claims 17, 18, 28, 55, and 57 of the specification.
[*Official Gazette May 20, 1941.*]